United States Patent
Baker et al.

(10) Patent No.: US 8,036,703 B2
(45) Date of Patent: Oct. 11, 2011

(54) IMAGE CAPTURE REPORTING BASED ON CONTENT-ASSOCIATED WIRELESS IDENTIFICATION

(75) Inventors: Richard M. Baker, Richardson, TX (US); Leonardo W. Estevez, Rowlett, TX (US); Ketan P. Malani, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1228 days.

(21) Appl. No.: 11/617,878

(22) Filed: Dec. 29, 2006

(65) Prior Publication Data

US 2008/0161044 A1   Jul. 3, 2008

(51) Int. Cl.
*H04M 1/06* (2006.01)
*H04Q 1/30* (2006.01)

(52) U.S. Cl. ........... 455/556.1; 235/472.02; 340/506; 340/541; 348/77; 348/169; 348/211.12; 348/372; 351/205; 358/302; 379/387.01; 455/566; 705/26.1; 709/202

(58) Field of Classification Search .......... 340/506, 340/541; 348/211.12, 211.99, 77, 169, 207.1, 348/211.2, 220.1, 372; 351/205; 379/387, 379/387.01; 455/556.1, 566; 235/472.02; 358/302; 705/26, 26.1; 709/202
See application file for complete search history.

(56) References Cited

U.S. PATENT DOCUMENTS

| | | | | |
|---|---|---|---|---|
| 6,122,526 A * | 9/2000 | Parulski et al. | ........... | 455/556.1 |
| 6,181,954 B1 * | 1/2001 | Monroe et al. | ........... | 455/557 |
| 6,392,697 B1 * | 5/2002 | Tanaka et al. | ........... | 348/220.1 |
| 6,628,326 B1 * | 9/2003 | Manico et al. | ........... | 348/211.12 |
| 6,687,515 B1 * | 2/2004 | Kosaka | ........... | 455/566 |
| 6,832,102 B2 * | 12/2004 | I'Anson | ........... | 455/556.1 |
| 7,129,972 B2 * | 10/2006 | Mizutani | ........... | 348/211.2 |
| 7,131,591 B1 * | 11/2006 | Herrod et al. | ........... | 235/472.02 |
| 7,148,918 B1 * | 12/2006 | Yoda | ........... | 348/211.3 |
| 7,158,175 B2 * | 1/2007 | Belz et al. | ........... | 348/231.3 |
| 7,301,456 B2 * | 11/2007 | Han | ........... | 340/541 |
| 7,321,297 B2 * | 1/2008 | Huang | ........... | 340/506 |
| 7,321,783 B2 * | 1/2008 | Kim | ........... | 455/556.1 |
| 7,325,923 B2 * | 2/2008 | Makino | ........... | 351/205 |
| 7,468,744 B2 * | 12/2008 | Edwards et al. | ........... | 348/211.1 |
| 7,610,331 B1 * | 10/2009 | Genske et al. | ........... | 709/202 |
| 7,724,281 B2 * | 5/2010 | Vale et al. | ........... | 348/207.1 |
| 7,792,876 B2 * | 9/2010 | Easwar | ........... | 707/803 |
| 2002/0163579 A1 * | 11/2002 | Patel et al. | ........... | 348/207.1 |
| 2006/0028557 A1 * | 2/2006 | Watanabe | ........... | 348/211.99 |
| 2006/0146140 A1 * | 7/2006 | Kennedy | ........... | 348/211.2 |
| 2007/0019077 A1 * | 1/2007 | Park | ........... | 348/211.99 |
| 2007/0291165 A1 * | 12/2007 | Wang | ........... | 348/372 |
| 2008/0068664 A1 * | 3/2008 | Gilad | ........... | 358/302 |
| 2008/0088703 A1 * | 4/2008 | Dollahite | ........... | 348/169 |
| 2008/0161044 A1 * | 7/2008 | Baker et al. | ........... | 455/556.1 |
| 2008/0305829 A1 * | 12/2008 | Monroe | ........... | 455/556.1 |
| 2009/0319392 A1 * | 12/2009 | Baum et al. | ........... | 705/26 |
| 2010/0013914 A1 * | 1/2010 | Bettesh et al. | ........... | 348/77 |

* cited by examiner

*Primary Examiner* — Gerald Gauthier
(74) *Attorney, Agent, or Firm* — Ronald O. Neerings; Wade J. Brady, III; Frederick J. Telecky, Jr.

(57) ABSTRACT

An electronic device. The device comprises circuitry for capturing data representing an image and circuitry for detecting a wireless signal associated with an object. The device also comprises circuitry, responsive to the detecting circuitry, for storing image data from said circuitry for capturing and associating and storing, with same image data, additional data included in the wireless signal.

40 Claims, 3 Drawing Sheets

IMAGE CAPTURE REPORTING BASED ON CONTENT-ASSOCIATED WIRELESS IDENTIFICATION

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to a device with image capturing ability and are more particularly directed to the device responding to the capture of image content having an associated wireless identification.

Content capture functionality exists in many forms, including by ways of examples portable electronic devices, photocopiers, facsimile machines, cameras (still and video), and other electronic devices. A cellular telephone is an example of such a portable electronic device that often includes, in addition to its telephony operability, content capture functionality. Further, some of these electronic devices are referred to as multimedia devices, typically portable and capable of various functions, including the capture of both audio and visual content with the ability to later provide that content in an output format to a user or to transmit the captured content elsewhere. A personal digital assistant ("PDA") is an example of such a multimedia device and is sometimes alternatively referred to as a palmtop, handheld computer, or pocket computer. These devices are handheld and may provide various functions, including image capture for either still or video images; further, numerous other functions may be included with such devices, including sound recording and playing, computational and data storage retrieval operations, telephone, facsimile, networking (e.g., internet and/or email communications), and presentation of captured or input content. Further, PDA and cellular telephone functionality also may be combined in a single device.

While the image content capture functions of the above-described devices serve many useful and desirable functions, certain of these functions also pose various problems given the proliferation of these devices, the portability of some of these devices, and the accuracy with which they may capture content. For example various content may be of a nature whereby its owner or the person having control over it does not want the content captured by one of these devices for reasons that may be technical, legal, private, personal choice, or a combination thereof. In all events, per the preferred embodiments, it is desired that if such content is captured, there is the ability to alert someone else that a user of the device has so captured the content, preferably without alerting the device user. The preferred embodiments are directed to such an endeavor, as demonstrated below.

BRIEF SUMMARY OF THE INVENTION

In the preferred embodiment, there is an electronic device. The device comprises circuitry for capturing data representing an image and circuitry for detecting a wireless signal associated with an object. The device also comprises circuitry, responsive to the detecting circuitry, for storing image data from said circuitry for capturing and associating and storing, with same image data, additional data included in the wireless signal.

Other aspects are also disclosed and claimed.

DETAILED DESCRIPTION OF THE INVENTION

The present invention is described below in connection with a preferred embodiment, namely, implemented as a portable electronic device that provides various operational functionality, such as may be included in a device that includes the functionality of a cellular telephone or multimedia device, by ways of example. The present inventors believe that the invention as embodied is especially beneficial in such applications. However, the invention also may be embodied and provide significant benefit in the form of other visual content-capturing devices, or the preceding devices may include additional functionality (e.g., such as from a personal digital assistant ("PDA")). Accordingly, it is to be understood that the following description is provided by way of example only and is not intended to limit the inventive scope.

Figure 1:
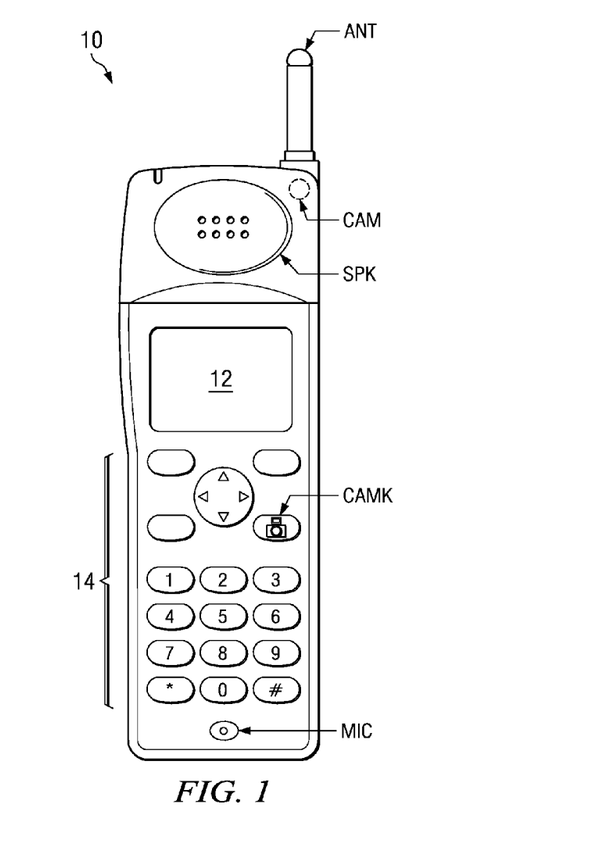
FIG. 1 illustrates a general diagram of a handset in connection with which a preferred embodiment may be implemented.

FIG. 1 illustrates a block diagram of a wireless telephone handset 10. The general nature of various aspects of handset 10 is known in the art, but novel aspects are added thereto and improve handset 10 for reasons appreciated throughout the remainder of this document. In the example of FIG. 1, the housing of handset 10 may take the shape of various form factors and provides the conventional human interface features, including microphone MIC, speaker SPK, visual display 12 which may serve solely as an output or which also may include an input functionality such as through a touch screen or write pad functionality, and keypad 14. Keypad 14 includes the usual keys for a wireless telephone handset, including numeric keys 0 through 9, the * and # keys, and other keys as in conventional wireless telephone handsets or that may be included with such handsets, such as soft keys adjacent display 12 as well as directional keys for purposes of navigating a cursor or the like on display 12. Still further in connection with keypad 14, handset 10 is shown to include a camera key CAMK in order to actuate a camera function of handset 10. The lens or other image detecting device of such a camera CAM is illustrated by a dashed circle in FIG. 1 so as to depict, as is often the case in contemporary devices, that camera CAM is on the reverse side of the handset housing shown in FIG. 1 and, thus, is not visible in the frontal perspective of the Figure. Camera CAM may be used for still or video image capture, or both. With respect to such image capture, according to preferred embodiments and as detailed later, the image data as captured is marked or associated with data in a manner that preferably identifies the image as captured as well as the device that performed the capture, and in addition a notification may be communicated by the capturing device in response to having made the capture.

Figure 2:
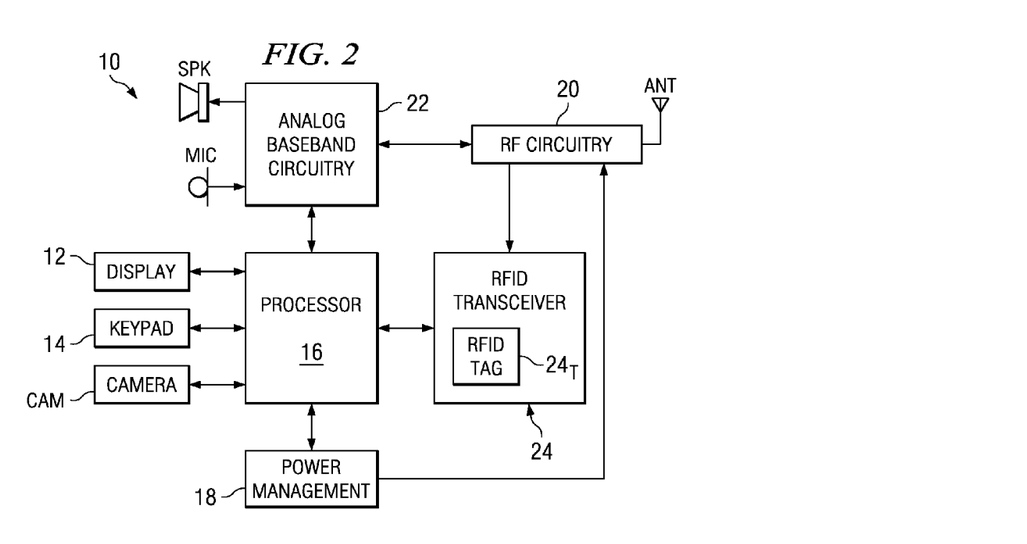
FIG. 2 illustrates an electrical functional block diagram of certain aspects of the handset of FIG. 1.

FIG. 2 illustrates the construction of an architecture for handset 10 according to a preferred embodiment. Of course, the particular architecture of a wireless handset (or other image-capturing device within the inventive scope) may vary from that illustrated in FIG. 2, and as such the architecture of FIG. 2 is presented only by way of example. As shown in FIG. 2, the operational functionality of handset 10 is generally controlled in part by a processor 16, that is coupled to visual display 12, keypad 14, camera CAM (which is controlled by camera key CAMK described above), and a power management function 18. Processor 16 in a preferred embodiment may include a core and separate digital signal processor ("DSP"), although for simplicity these devices are not separately shown but may be included on a single integrated circuit as a combined processor such as a Texas Instruments Incorporated OMAP™ processor. Processor 16 includes a programmable logic device, such as a microprocessor or microcontroller, that controls the operation of handset 10 according to a computer program or sequence of executable operations stored in program memory. Preferably, the program memory is on-chip with processor 16, but alternatively may be implemented in read-only memory ("ROM") or other storage in a separate integrated circuit. The computational capability of processor 16 depends on the level of functionality required of handset 10, including the "generation" of wireless services for which handset 10 is to be capable. As known in the art, modern wireless telephone handsets can have a great deal of functionality, including the capability of Internet web browsing, email handling, digital photography, game playing, PDA functionality, and the like. Such functionality is in general controlled by processor 16. In addition, processor 16, and possibly through its separate DSP component if so included, performs the bulk of the digital signal processing for signals to be transmitted and signals received by handset 10. These functions include the necessary digital filtering, coding and decoding, digital modulation, and the like. As detailed later, processor 16, again possibly through its DSP, is operable to associate certain information with image data captured by handset 10, when handset 10 receives a wireless communication from an external device. In any event, contemporary examples of DSPs suitable for use as a DSP in handset 10 according to this embodiment include the TMS320c5x family of digital signal processors available from Texas Instruments Incorporated, although other DSPs also may perform the functionality detailed herein. Power management function 18 distributes regulated power supply voltages to various circuitry within handset 10 and manages functions related to charging and maintenance of the battery of handset 10, including standby and power-down modes to conserve battery power.

Handset 10 also includes radio frequency ("RF") circuitry 20, which is coupled to an antenna ANT and to an analog baseband circuitry 22. RF circuitry 20 includes such functions as are necessary to transmit and receive the RF signals at the specified frequencies to and from a wireless telephone communications network. RF circuitry 20 is thus contemplated to include such functions as modulation circuitry and RF input and output drivers. Analog baseband circuitry 22 processes the signals to be transmitted (as received from microphone MIC) prior to modulation, and the received signals (to be output over speaker SPK) after demodulation (hence in the baseband), to apply the necessary filtering, coding and decoding, and the like. Further, either or both microphone MIC and speaker SPK, and analog baseband circuitry 22, may provide functions in addition to telephony, such as in connection with multimedia applications. Such functions may be used for notification, entertainment, gaming, data input/output, PDA functionality, and the like. Lastly, typical functions included within analog baseband circuitry 22 include an RF coder/decoder ("CODEC"), a voice CODEC, speaker amplifiers, and the like, as known in the art.

Completing FIG. 2 and in a preferred embodiment, handset 10 also includes a wireless transceiver, which in a preferred embodiment is a radio frequency identification ("RFID") transceiver 24. RFID transceiver 24 is coupled to processor 16 and RF circuitry 20. By way of introduction, RFID transceiver 24, sometimes referred to in the art as a scanner or reader, includes circuitry, as may be ascertained by one skilled in the art, to issue a radio frequency signal, via RF circuitry 20 and antenna ANT, so as to interrogate an area proximate handset 10 to determine if one or more RFID tags are located in that area. If an RFID tag is thusly within the interrogated area, the tag in response to the interrogate signal broadcasts a response, which typically therefore is received by antenna ANT and communicated to RFID transceiver 24 via RF circuitry 20. Transceiver 24 reports the results of this interrogation to processor 16, and preferably to its DSP if so included. Transceiver 24 may be constructed by one skilled in the art, with examples readily known or commercially available, such as from Texas Instruments Incorporated. In response, therefore, processor 16 (or the DSP thereof) is informed whether an RFID tag with a particular identification is located within the area and, if so, then processor 16 may identify image data captured within a certain time of that identification so that such image data and the event of capturing it may be tracked in a manner that is preferably imperceptible to the user of handset 10, as further detailed below.

Figure 3:
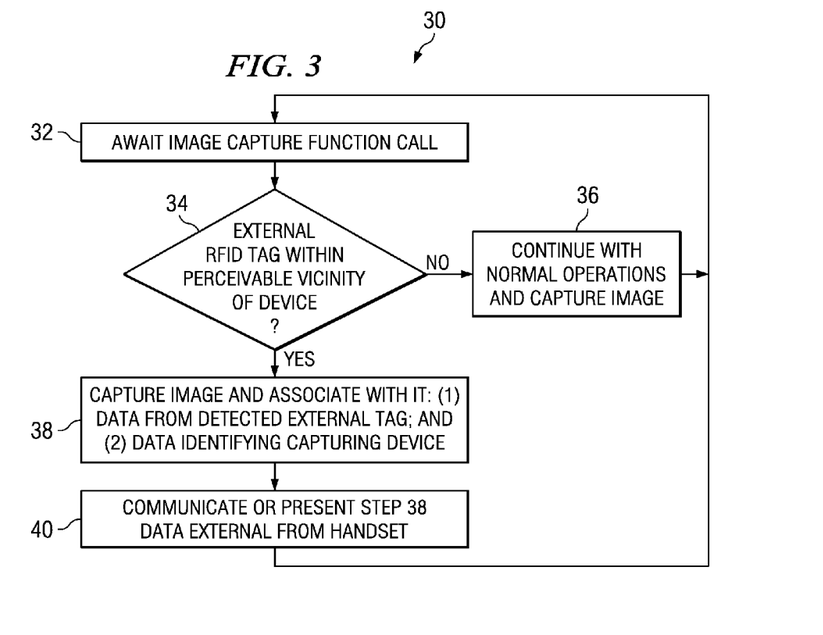
FIG. 3 illustrates a flowchart of a methodology of a portion of operation of the handset of FIG. 1.

FIG. 3 illustrates a flowchart of a preferred embodiment method 30 for handset 10. Method 30 may be performed by various combinations of software and hardware of handset 10, such as by computer readable media (i.e., programming in program memory) to processor 16 and the circuitry therein, along with resulting response(s) with respect to image capture by handset 10 as appreciated below. Further, method 30 only illustrates a portion of the operations of handset 10, as these operations are relevant to the preferred embodiment while they may be combined with numerous other functions that are now included or may in the future be included within a device of the type of handset 10.

Looking then to method 30, it is presumed to occur after start-up or initialization or reset of handset 10, and note that method 30 may be combined with other functions known or ascertainable in the art. In any event, method 30 begins with a step 32, wherein handset 10 awaits an image capture function call in processor 16, that is, when the user or some other activity occurs that thereby calls upon processor 16 to cause handset 10 to capture image data, where again such capture activity may be in the sense of either still or video data perceivable by camera CAM. For example, the user of handset 10 may depress camera key CAMK in order to actuate a camera function and camera CAM of handset 10, thereby generating one or more signals that represent a capture function call in processor 16. In this event or in another where handset 10 is provoked to capture image data, step 32 occurs and method 30 continues from step 32 to step 34.

Figure 4:
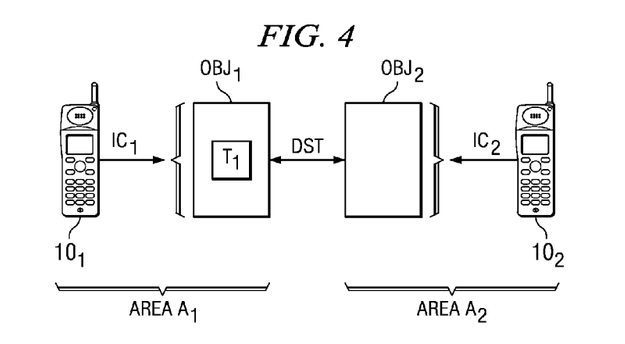
FIG. 4 illustrates different areas, each with a respective portable handset and an object that may be the subject of an image capture by the respective handset, where one area includes an RFID tag and the other does not.

Before proceeding with a discussion of other steps in method 30 of FIG. 3, and to further appreciate method 30 in its entirety, FIG. 4 is introduced and illustrates a block diagram of two different areas $A_1$ and $A_2$, each with a respective object $OBJ_1$ and $OBJ_2$ as examples for the application of method 30. Each of areas $A_1$ and $A_2$ includes a respective handset 10₁ and 10₂, where each handset $10_x$ is an example of a separate device like handset 10 of FIG. 1 and, therefore, includes the circuitry of FIG. 2 and is operable to perform method 30 of FIG. 3. These example objects are chosen as examples for which operation of the preferred embodiment may or may not be desirable in certain circumstances, where as detailed below object $OBJ_1$ triggers a response from handset 10₁ whereas object $OBJ_2$ does not trigger a comparable response from handset 10₂. More particularly, in FIG. 4, each handset $10_x$ is illustrated to demonstrate that it performs a respective image capture $IC_x$ of a view that includes part or all its respective object $OBJ_x$ (and potentially other objects within the image detector field of view), where again that action may be performed in response to a user of the handset depressing the CAMK key of the handset. However, also in a preferred embodiment, note that an RFID tag $T_1$ is associated with object $OBJ_1$, where in this case the tag is attached to or otherwise incorporated with or within an RFID readable distance of object $OBJ_1$; thus, and per the RFID art, a tag such as tag $T_1$ is detectable by an RFID transceiver (or reader or scanner) so long as the transceiver is within a certain radius of tag $T_1$ and, accordingly, assume in FIG. 4 that tag $T_1$ is within such a radius and thereby detectable by handset 10₁ since it includes such a transceiver. Of course, as known in the art, this radius may be affected by various factors. Further, tag $T_1$ may be constructed by one skilled in the art, with examples readily known or commercially available, such as from Texas Instruments Incorporated. However, in contrast, no RFID tag is with object $OBJ_2$. Lastly, for sake of reference below, a distance DST is shown between objects $OBJ_1$ and $OBJ_2$, where in the illustrated example distance DST is greater than the RFID sensitivity of each handset $10_x$. In other words, therefore, handset 10₂ in area $A_2$ is positioned so that it will not detect tag $T_1$ in area $A_1$ due to the length of distance DST.

Returning now to FIG. 3 and its method 30, in step 34, having been reached because an image capture function performable by handset 10 is called, then RFID transceiver 24 of handset 10 determines whether an RFID tag is within the perceivable vicinity of the handset device; thus, in the phraseology of FIG. 4, each handset $10_x$, preferably by way of its RFID transceiver 24 and also with processor 16, determines whether an RFID tag is within the RFID perceivable radius of the handset. The manner of performing this determination is known in the RFID art, whereby in general an RFID transceiver issues a wireless interrogating signal and, if an RFID tag is within a certain distance of the transceiver, then the RFID interrogating signal causes an excitation of circuitry within the RFID tag which in turn issues a responsive wireless signal to the RFID transceiver; moreover, the responsive signal will include an identification of the RFID tag, which typically includes a unique identifier such as a unique number that is received and understood by the transceiver. Thus, in the example of the handsets of FIG. 4, handset 10₂ will make a negative finding for the query of step 34 because there is no RFID tag in area $A_2$, while handset $A_1$ will make an affirmative finding of step 34 as it will detect tag $T_1$. A negative finding of step 34 causes method 30 to proceed to step 36, while a positive finding of step 34 causes method 30 to continue to step 38.

In step 36, a handset 10 operating per method 30 continues with normal operation of the handset. Thus, in the example of FIG. 4, handset 10₂, having not detected an RFID tag within area $A_2$ operates per step 36 and provides its user with the typical functionality of which the handset is capable. Thus, since an image capture function was called in the preceding step 32, then in step 36, handset 10₂ performs an image capture $IC_2$ of object $OBJ_2$, to which handset 10₂ is directed, thereby capturing the image data and storing it, as may be achieved by various manners known or ascertainable by one skilled in the art. In this sense, therefore, method 30 is completely transparent to that user and no additional steps are taken as a result of the handset not being located within an area that includes an RFID tag. Moreover, also transparent to the user is that while normal operations continue, method 30 returns from step 36 to step 32 to thereby await a next image capture call, and upon the call of such a function, method 30 then proceeds to step 34 as detailed herein.

In step 38, a handset 10 operating per method 30 captures the image, but in addition and per a preferred embodiment, handset 10 stores additional data and associates that data with the data representing the captured image. For instance and with reference to FIG. 4, in operation of handset 10₁ step 38 performs an image capture $IC_1$ of object $OBJ_1$, since handset 10₁ is assumed to be directed thereto, and in addition it associates data with the data representing the captured image of object $OBJ_1$. This association of the image-data and the additional data permits a subsequent analysis of the additional data as corresponding to the image-data, as detailed later. In any event, the additional data may include various information. In one preferred embodiment, the additional data is provided in the wireless signal from the RFID tag associated with the object. Further, for example, such tag-provided information may include a unique identifier that identifies the object associated with the tag. For instance and again with reference to FIG. 4, in operation of handset 10₁, step 38 may store data obtained from tag $T_1$ associated with object $OBJ_1$. As another example of tag-provided information stored in step 38, and as demonstrated below, the stored data is for provoking handset 10 to communicate in response to, and about, the image capture event of step 38. Also in a preferred embodiment, in addition to data detected from the RFID tag external from handset 10, step 38 may store, and associate with the captured image data, data uniquely identifying handset 10. For instance and as detailed later, in one preferred embodiment, handset 10 may include its own affixed RFID tag, that is, one that is internal or otherwise attached to its housing, where that affixed RFID tag includes a unique identifier of the respective handset. In this case, then if step 38 optionally stores data uniquely identifying handset 10, that unique identifier may be obtained by RFID transceiver 24 by reading the RFID tag affixed to handset 10. Alternatively, the unique identifier may be provided from other sources, such as the memory readable by processor 16 or a subscriber identity module ("SIM") card. In any case, therefore, the identifier that may be stored in step 38 thereby distinguishes handset 10 from other handsets, for reasons also appreciated below.

In step 40, some or all of the data stored by handset $10_x$ in step 38 is communicated or presented external from the handset, and preferably this communication is accomplished in a manner that is undetectable to the user of handset 10. For example, handset 10 may communicate the step 38 additional data without any indication on visual display 12 or sound via speaker SPK, thereby being undetected by a typical user of handset 10. Note that this communication may occur in numerous fashions according to alternative preferred embodiments, and while step 40 is shown to occur immediately following step 38, in an alternative the flow may continue from step 38 back to step 32 (and the steps thereafter), while at some later time the communications now described with respect to step 40 are achieved. In any event, with step 40, note that the step 38 additional data is accessed and thereby serves a reporting function that details the image capture event of that occurrence of step 38. For example, in one preferred embodiment, step 40 causes handset 10 to communicate a message to a receiving device, where that message may include part or all of the step 38 data. In this regard, and by way of example, handset 10 may place a phone call or send a message (e.g., text message, such as via SMS) to another receiver, thereby reaching a third party that is thusly informed of the step 38 occurrence by handset 10. Once step 40 is achieved, method 30 returns to step 32 to await a next image capture call and the method repeats in the manner just described.

From the preceding, it may be appreciated that the preferred embodiments provide an apparatus and method for use with a device having image capturing functionality. Moreover, with the functionality of method 30, the preferred embodiments may serve a tracking, anti-piracy, and/or a deterrent purpose. More specifically and returning to the example of FIG. 4, suppose that handset 10$_1$ is used per method 30 to perform image capture IC$_1$ of image data, which as demonstrated above causes an affirmative finding of step 34 because tag T$_1$ is associated with object OBJ$_1$. In response, handset 10$_1$ also in its step 38 stores, and associates with the image capture IC$_1$ data, additional data pertaining to image capture IC$_1$ event, and in the subsequent step 40 handset 101 communicates part or all of that additional data to a receiving device. Suppose, therefore, that object OBJ$_1$ is a secure document or object, or that area A$_1$ is a secure environment, and in either or both cases assume that image capturing of object OBJ$_1$ is prohibited. Suppose further that image capture IC$_1$ is made in violation of that security. As a result, and preferably without notice to the user of handset 10$_1$, the corresponding step 38 stored data from tag T$_1$ is communicated by handset 10$_1$ to a different receiver, where such data may identify the object that was subject to the image capture (i.e., object OBJ$_1$) and optionally also uniquely identify the operating handset (i.e., handset 10). In this way, therefore, the receiver of this information may track the event and respond as desired to this unauthorized image capture. Further in this regard, action may be taken against the person that performed the unauthorized image capture so as to serve an anti-piracy purpose. Still further, where users of devices such as handset 10 are informed of the above-described functionality, they may be deterred from performing unauthorized image captures due to the risk that such activity may be reported by their image-capturing device.

Method 30 has numerous applications and may be modified in various respects, and all may be included within the present inventive scope. For example, object OBJ$_1$ could be anything with which an RFID tag can be affixed or associated. For example, object OBJ$_1$ could be a human that is carrying an RFID tag on his or her person. In this way, if someone with a device such as a handset 10 performs method 30, and thereby captures photographs or videos of the person with the RFID tag, then notice of that image capture can be reported to someone, including the person who is so photographed or videoed. Thus, a preferred embodiment may be used to protect privacy rights. Moreover, because a preferred embodiment may include in step 38 the storage of a unique identifier of the device that captured the image at issue and/or of the object that is captured, then additional evidence is provided to trace that device and possibly the person that operated it to take the unauthorized or undesired image capture. As another example, the manner in which step 40 communicates the step 38 data may be accomplished in numerous different ways. For example, for each occurrence of step 40, the information could be communicated to an agency or the provider of the communication service of handset 10. As another example, handset 10 may be provided with an interface whereby the data it stores in step 38 may be read either via a readable media or storage written by handset 10, by wire, or wirelessly, where in the first case then someone with access to the device, such as an investigator or the like, may then access the step 38 data so as to investigate potentially-unauthorized image capture events. As yet another modification, the step 38 additional data may be used to modify or affect the actual captured image data, thereby preventing the captured image from being fully displayed or displayed at high resolutions, where additional details for such functional limitations may be found in co-pending U.S. patent application Ser. No. 11/564,400, entitled "Location Based Portable Device Feature Disabler," filed Nov. 29, 2006, which is hereby incorporated fully herein by reference.

Completing the discussion of FIG. 3, note that while the flowchart therein illustrates the flow of steps in response to each time an image capture function is called, in lieu thereof or in addition thereto, in an alternative methodology the steps following step 32 may be performed after the expiration of a period of time or another sequence of operations performed by handset 10. For example, if handset 10 is performing a video image capture, then method 30 could be repeated for each period of time (e.g., 50 frames of video capture or a timeout measured in seconds or fractions of seconds) during the video capture. In this manner, if handset 10 is being directed to different objects, then if some of those objects are not attached to or marked or otherwise associated with an RFID tag then such objects may be captured as images per step 36, whereas if one or more other of those objects are marked with an RFID tag, then such objects may be captured as images per step 38 while additional data is also associated therewith for later communication external from the handset. In any of these approaches, therefore, at each subsequent image capture call or passage of time, if the user of handset 10 moves the handset to a different area (e.g., leaves area A$_1$ in FIG. 4) or seeks to capture the image of a different object, then handset 10 will each time operate per the steps of FIG. 3.

Figure 5:
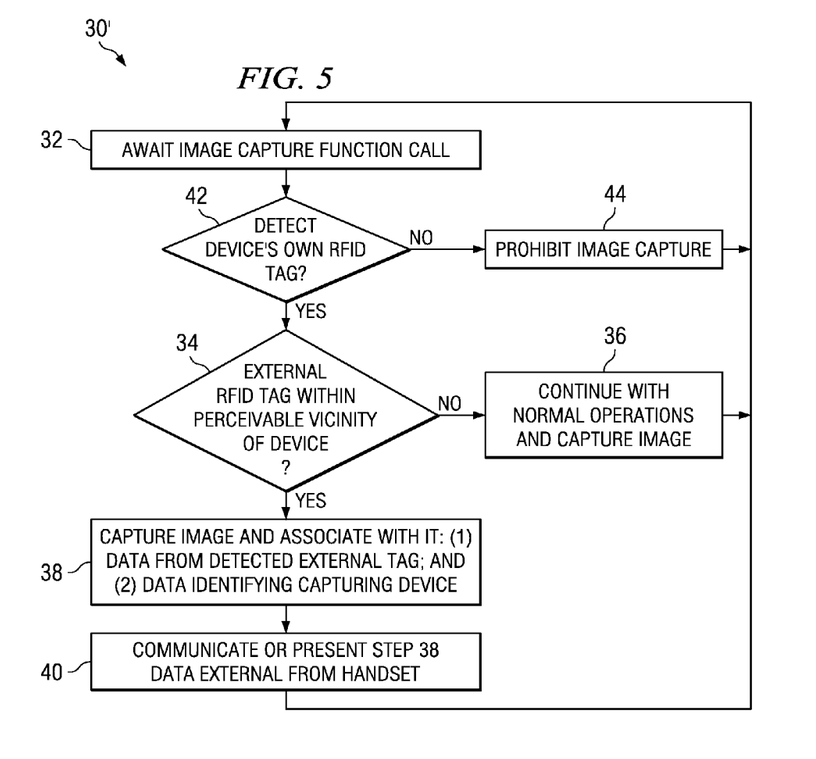
FIG. 5 illustrates an alternative flowchart of a methodology of the operation of the handset of FIG. 1.

FIG. 5 illustrates method 30 from FIG. 3 with two additional steps, as may be implemented in an alternative preferred embodiment and, thus, the method of FIG. 5 is indicated as 30'. Method 30' differs from method 30 in that the former includes an additional step 42, inserted between steps 32 and 34 of method 30 in FIG. 3, and if that step is answered in the negative as detailed below, the flow continues to another additional step 44, after which the flow returns to step 32. Further, to perform method 30', the alternative preferred embodiment also includes an RFID tag 24, in handset 10, as will now be noticed as also shown in FIG. 2 as part of RFID transceiver 24. In addition, recall earlier that step 38 optionally stores data that uniquely identifies handset 10 and such data may come from an RFID tag associated with handset 10—in that case, then RFID tag 24$_T$ in FIG. 2 serves that purpose as well as supporting the additional functionality of method 30', as detailed below.

Turning to method 30', steps 42 and 44 provide an aspect to overcome potential RF interference or an attempt to jam the functionality of methods 30 and 30'. Particularly, following an image capture call in step 32, method 30' continues to step 42, where handset 10 determines if it detects its own RFID tag. This detection may be achieved using the same circuitry of handset 10 as used for other RFID interrogations, such as for example any one or more of RFID transceiver 24, RF circuitry 20, antenna ANT, and processor 16. Thus, in step 42, handset 10 issues an interrogation signal and under normal operation of method 30' there is the expectation that tag 24$_T$ will respond with its preferably-unique tag identifier, and optionally the identifier may be confirmed by processor 16, such as by way of a lookup function. If in step 42 handset 10 so detects its own RFID tag $24_T$, then method 30' continues to step 34. To the contrary, if in step 42 handset 10 does not, or fails to, detect its own RFID tag $24_T$, then method 30' continues to step 44.

In step 44, having been reached because handset 10 did not detect its own RFID tag, then method 30' prohibits (or disrupts or otherwise inhibits or does not perform) the image capture that was called by the immediately-preceding occurrence of step 32. Note that the prohibition of step 44 may be implemented in various forms, such as by software as executed by processor 16, or in a hardware approach such as by disabling, or disrupting power to, the camera functionality CAM (or a portion thereof) that is otherwise caused to operate when the user of handset 10 depresses camera key CAMK. In any event, therefore, and by way of example, if handset 10 is in an area where considerable RF interference occurs, then such interference could be misinterpreted and/or disturb the proper application of steps in method 30, which potentially could permit handset 10 to capture an image for which it is desired to report the capture of such an image. In other words, RF interference could effectively prohibit handset 10 from detecting a nearby RFID tag that is intended to cause handset 10 to report the capture of an image of an object associated with that RFID tag. However, with method 30', steps 42 and 44 therefore provide a response if handset 10 cannot properly detect its own RFID tag $24_T$, that is, in which case step 44 prohibits the capture of the desired image. Thus, steps 42 and 44 of method 30' seek to anticipate the possibility of an intended RF jamming attempt. Specifically, as the preferred embodiment becomes more ubiquitous in use, wrongdoers could attempt to cause devices so equipped to continue to capture images without saving additional data associated therewith by providing jamming interference in certain areas or some other signal that attempts to overpower RFID transceiver 24 so that RFID tags within the communications range of the transceiver cannot be read. As a result, method 30' includes steps 42 and 44 as a failsafe in that in such an environment, the included tag $24_T$ within handset 10 also will not be successfully read, and method 30' in response directs the flow to step 44 and thereby precludes the image capture. Thereafter, flow is returned to step 32 and, thus, at each subsequent image capture function call (or timeout period) this check can be repeated, so that if the user of handset 10 moves it to a different area or if the interference subsides, then handset 10 will permit the occurrences of steps 34 and the steps thereafter as detailed above in connection with FIG. 3.

While the preceding illustrates preferred embodiments that are portable devices capable of image capture and wireless communications, alternative preferred embodiments may include devices that are generally not considered portable or are not necessarily wireless. For example, method 30 (or 30') may implemented in a generally stationary photocopier; such a device may capture (including scanning) images as known in the art, and may be further modified to include an RFID transceiver as well as the ability to communicate per step 40 when step 34 is answered in the affirmative. Indeed, note that in contemporary applications, some photocopiers are already coupled to phone lines or data networks, thereby permitting communications with other devices. Thus, such functionality may be additionally configured and/or programmed per method 30 (or 30') to communicate per step 40. Similarly, facsimile machines are capture content devices and are connected to receive and transmit via telephony, and as such these too may be modified to include an RFID transceiver and programming to perform method 30 (or 30'), using their existing telephony connections, or other manners of communications, to communicate per step 40 when step 34 is answered in the affirmative. Lastly, various alterations may be made to cameras (still and video) also to implement method 30 (or 30'). While all of these alternatives may thereby be included within the inventive scope, the present inventors foresee a more extensive use in portable devices, particularly those that permit wireless communications, as these devices are becoming more ubiquitous, more capable of higher resolution image capture, and therefore increasingly likely as to be used for undesired or unauthorized image capture.

Given the preceding, the preferred embodiments provide various devices with image capturing ability and that may respond to the capture of image content where such content is associated with a wireless identification. In a preferred embodiment, such response is triggered by RFID communications. However, alternative preferred embodiments may be constructed using various other wireless communications, whereby a handset (e.g., 10) detects the presence of a signal associated with an object that may be captured as an image, and in response to that signal handset 10 captures the image but also associates with the image data additional data from the external associated signal. For example, Bluetooth, Zigbee, and WiFi are increasingly used wireless communication technologies. One skilled in the art would typically anticipate that such technologies require pairing to establish a two-way communication; however, it is recognized in connection with the preferred embodiments that such technologies also may be used to support methods 30 and 30' without fully establishing the two way communication. Specifically, any of these protocols commences communication by announcing some type of identification (e.g., a code, a MAC address, or other). Thus, in step 34 of either method 30 or 30', rather than issuing an interrogating signal and then potentially detecting an RFID tag in response thereto, handset 10 could search to detect the mere presence of a signal, such as the announcement of a Bluetooth or Zigbee identification by a Bluetooth or Zigbee transmitting device. No response by handset 10 to the transmitting device is necessary to achieve these methods (although one could be provided), and thus the method could then proceed with steps 38 and 40, having determined from the announced identification a signal associated with content for which image capture should be associated with that signal.

In addition to the above mentioned applications, the preferred embodiments may facilitate sharing of images with interested parties where individuals with portable or mobile devices containing an RFID tag with the individual's email address or phone number (or carrying or wearing some RFID tag) may enable automatically sending the picture taken to their mobile device or internet email address (utilizing MMS or as an email attachment). Scanning of individual subject RFID devices may be limited to close proximity scans of associated mobiles before the picture is taken (utilizing HF RFID technology) or may be scanned automatically at a distance (utilizing UHF RFID technology) at the time of image capture. The option to send the captured image to all scanned subjects may appear with preview of the picture after it has been captured. In this (or another) application, the scanned IDs associated with those in the vicinity at image acquisition may be wirelessly transmitted to a server to construct a temporal log of associations which might be subsequently accessed by the subscriber (or the subscriber's legal guardian). This associative log might also index into a database of images which might subsequently become accessible via responses to associated ID and time window queries.

From the above, one skilled in the art should further appreciate that while the present embodiments have been described in detail, various substitutions, modifications or alterations could be made to the descriptions set forth above without departing from the inventive scope, as is defined by the following claims.

The invention claimed is:

1. An electronic device, comprising:
   imaging apparatus for directing toward an object;
   circuitry for capturing data from the imaging apparatus and for representing an image of the object;
   circuitry for detecting a wireless signal associated with the object; and
   circuitry, responsive to the detecting circuitry, for storing image data from the circuitry for capturing, and also responsive to the detecting circuitry for associating and storing, with the stored image data, additional data included in the wireless signal.

2. The electronic device of claim 1, and further comprising circuitry for communicating the additional data to a destination external from the electronic device.

3. The electronic device of claim 2:
   wherein the device comprises wireless telephony circuitry; and
   wherein the wireless telephony circuitry comprises the circuitry for communicating.

4. The electronic device of claim 2 and further comprising circuitry for displaying information to a user of the electronic device, wherein the circuitry for communicating the additional data communicates the additional data without providing an indication of the communicating on the circuitry for displaying.

5. The electronic device of claim 1, and further comprising circuitry for wirelessly communicating the additional data to a destination external from the electronic device.

6. The electronic device of claim 1 wherein the circuitry for detecting comprises:
   circuitry for issuing an interrogation signal to detect if the device is within a discernable range of a responder device, the responder device for providing, as the wireless signal associated with an object, a responsive signal to the interrogation signal; and
   wherein the circuitry for associating and storing the additional data is operable in response to the circuitry for issuing an interrogation signal detecting the responder device.

7. The electronic device of claim 6 wherein the circuitry for issuing an interrogation signal comprises radio frequency identification circuitry.

8. The electronic device of claim 6 wherein the responder device comprises a radio frequency identification tag.

9. The electronic device of claim 6:
   wherein the circuitry for issuing an interrogation signal comprises radio frequency identification circuitry; and
   wherein the responder device comprises a radio frequency identification tag.

10. The electronic device of claim 6 wherein the responder device is affixed to the object.

11. The electronic device of claim 1 wherein the device is a portable device.

12. The electronic device of claim 1 wherein the electronic device is selected from a set consisting of a photocopier, facsimile, handheld camera, and wireless telephone.

13. The electronic device of claim 1 wherein the circuitry for detecting a wireless signal comprises circuitry for detecting a wireless signal selected from a set consisting of Bluetooth, Zigbee, and ISM band.

14. The electronic device of claim 1 wherein the circuitry for capturing is for capturing data selected from a set consisting of still image data and video image data.

15. The electronic device of claim 1:
   wherein the circuitry for detecting comprises:
      circuitry for issuing an interrogation signal to detect if the device is within a discernable range of a first responder device, the responder device for providing, as the wireless signal associated with an object, a responsive signal to the interrogation signal; and
   wherein the device further comprises a second responder device;
   wherein the circuitry for issuing an interrogation signal is also to detect the second responder device.

16. The electronic device of claim 15 and further comprising circuitry for inhibiting the circuitry for capturing in response to a failure to detect the second responder device.

17. The electronic device of claim 15 wherein the additional data comprises a unique identifier provided by the second responder device.

18. The electronic device of claim 1:
   wherein the circuitry for detecting comprises:
      circuitry for issuing an interrogation signal to detect if the device is within a discernable range of a first responder device, the responder device for providing, as the wireless signal associated with an object, a responsive signal to the interrogation signal; and
   wherein the electronic device further comprises a second responder device;
   wherein the circuitry for issuing an interrogation signal is also to detect the second responder device; and
   wherein the electronic device further comprises circuitry for inhibiting the circuitry for capturing in response to a failure to detect the second responder device.

19. The electronic device of claim 1 and further comprising circuitry for associating with the additional data an identifier of the electronic device.

20. The electronic device of claim 1 wherein the circuitry for detecting operates in response to a function call to the circuitry for capturing.

21. The electronic device of claim 1 wherein the circuitry for detecting operates in response to a passage of a predetermined time period.

22. A method of operating a portable electronic device, comprising:
   directing an imaging apparatus of the portable electronic device toward an object;
   detecting with the portable electronic device a wireless signal associated with the object; and
   in the portable electronic device, storing image data subject to the detecting step, wherein the storing step stores the image data and associates with the same image data additional data included in the wireless signal.

23. The method of claim 22 and further comprising communicating the additional data to a destination external from the electronic device.

24. The method of claim 22 and further comprising wirelessly communicating the additional data to a destination external from the electronic device.

25. The method of claim 22 wherein the detecting step comprises:
   issuing an interrogation signal to detect if the device is within a discernable range of a responder device, the responder device for providing, as the wireless signal associated with an object, a responsive signal to the interrogation signal; and
   wherein the storing step is in response to detecting the responder device.

26. The method of claim 22 wherein the step of detecting a wireless signal comprises detecting a wireless signal selected from a set consisting of Bluetooth, Zigbee, and ISM band.

27. The method of claim 22 wherein the storing step is for storing data selected from a set consisting of still image data and video image data.

28. The method of claim 22:
wherein the detecting step comprises:
issuing an interrogation signal to detect if the device is within a discernable range of a first responder device, the responder device for providing, as the wireless signal associated with an object, a responsive signal to the interrogation signal; and
wherein the device further comprises a second responder device;
and further comprising issuing an interrogation signal to detect the second responder device.

29. The method of claim 28 and further comprising inhibiting the circuitry for capturing in response to a failure to detect the second responder device.

30. An electronic device, comprising:
circuitry for capturing data representing an image;
circuitry for detecting a wireless signal associated with an object; and
circuitry, responsive to the detecting circuitry, for storing image data from said circuitry for capturing and associating and storing, with same image data, additional data included in the wireless signal,
wherein the circuitry for detecting comprises circuitry for issuing an interrogation signal to detect if the device is within a discernable range of a responder device, the responder device for providing, as the wireless signal associated with an object, a responsive signal to the interrogation signal; and
wherein the circuitry for associating and storing the additional data is operable in response to the circuitry for issuing an interrogation signal detecting the responder device.

31. The electronic device of claim 30 wherein the circuitry for issuing an interrogation signal comprises radio frequency identification circuitry.

32. The electronic device of claim 30 wherein the responder device comprises a radio frequency identification tag.

33. The electronic device of claim 30:
wherein the circuitry for issuing an interrogation signal comprises radio frequency identification circuitry; and
wherein the responder device comprises a radio frequency identification tag.

34. The electronic device of claim 30 wherein the responder device is affixed to the object.

35. An electronic device, comprising:
circuitry for capturing data representing an image;
circuitry for detecting a wireless signal associated with an object; and
circuitry, responsive to the detecting circuitry, for storing image data from said circuitry for capturing and associating and storing, with same image data, additional data included in the wireless signal;
wherein the circuitry for detecting comprises circuitry for issuing an interrogation signal to detect if the device is within a discernable range of a first responder device, the responder device for providing, as the wireless signal associated with an object, a responsive signal to the interrogation signal; and
wherein the device further comprises a second responder device;
wherein the circuitry for issuing an interrogation signal is also to detect the second responder device.

36. The electronic device of claim 35 and further comprising circuitry for inhibiting the circuitry for capturing in response to a failure to detect the second responder device.

37. The electronic device of claim 35 wherein the additional data comprises a unique identifier provided by the second responder device.

38. A method of operating a portable electronic device, comprising:
detecting a wireless signal associated with an object; and
storing image data subject to the detecting step, wherein the storing step stores the image data and associates with the same image data additional data included in the wireless signal;
wherein the detecting step comprises issuing an interrogation signal to detect if the device is within a discernable range of a responder device, the responder device for providing, as the wireless signal associated with an object, a responsive signal to the interrogation signal; and
wherein the storing step is in response to detecting the responder device.

39. A method of operating a portable electronic device, comprising:
detecting a wireless signal associated with an object; and
storing image data subject to the detecting step, wherein the storing step stores the image data and associates with the same image data additional data included in the wireless signal;
wherein the detecting step comprises issuing an interrogation signal to detect if the device is within a discernable range of a first responder device, the responder device for providing, as the wireless signal associated with an object, a responsive signal to the interrogation signal;
wherein the device further comprises a second responder device;
and further comprising issuing an interrogation signal to detect the second responder device.

40. The method of claim 39 and further comprising inhibiting the circuitry for capturing in response to a failure to detect the second responder device.

* * * * *